United States Patent

[11] 3,600,578

[72] Inventors Karl G. Porges
Evanston;
Raymond Gold, Woodridge, both of, Ill.
[21] Appl. No. 864,443
[22] Filed Oct. 7, 1969
[45] Patented Aug. 17, 1971
[73] Assignee The United States of America as represented by the United States Atomic Energy Commission

[54] REACTOR POWER LEVEL SENSING DEVICE USING CHERENKOV RADIATION
6 Claims, 1 Drawing Fig.
[52] U.S. Cl. ...................................................... 250/71.5 R,
176/19 R, 250/106 R
[51] Int. Cl. ...................................................... G01t 1/20
[50] Field of Search ........................................... 250/71.5,
83.3, 106; 176/19

[56] References Cited
UNITED STATES PATENTS
2,954,473   9/1960   Hoover et al. ............... 250/43.5 (R) X
3,049,619   8/1962   Genovese, Jr. ............... 250/71.5
3,140,394   7/1964   Roberts ....................... 250/71.5

OTHER REFERENCES
Atkinson et al., "Gas Cerenkov Counters"; Rev. of Sci. Inst.; Vol. 30, No. 10, Oct. 1959, 250/71.5 C; pp. 864— 868

*Primary Examiner*—James W. Lawrence
*Assistant Examiner*—Morton J. Frome
*Attorney*—Roland A. Anderson ABSTRACT: A gas filled probe is positioned within a reactor to intercept gamma rays developed therein. The gamma rays above a predetermined threshold energy level develop Compton recoil electrons in the gas and tube with velocities greater than the velocity of light in the gas. The Cherenkov radiation resulting from the slowing down of the electrons is detected and measured by a photomultiplier to measure the power level of the reactor.

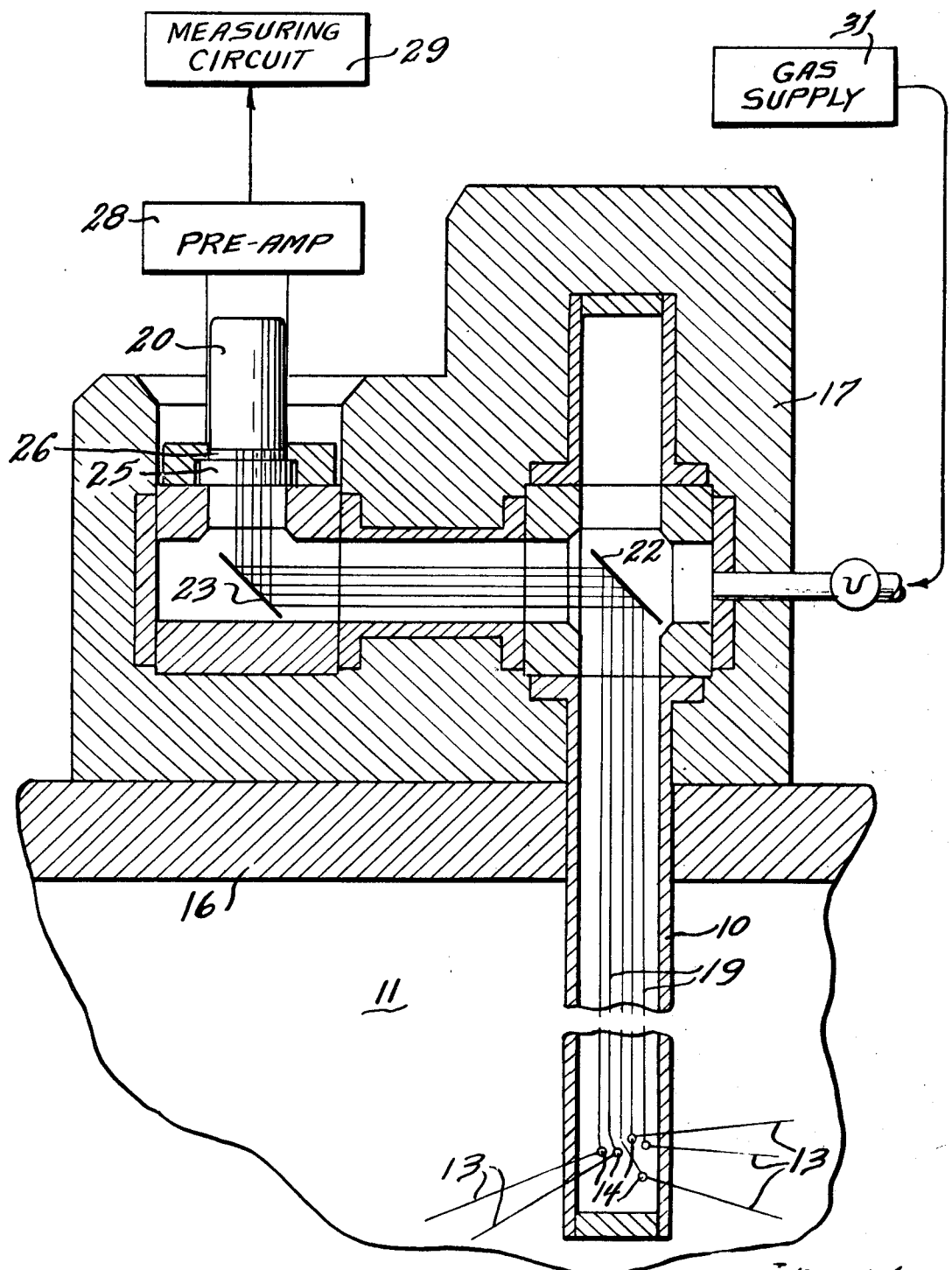

REACTOR POWER LEVEL SENSING DEVICE USING CHERENKOV RADIATION

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

For the purposes of control, reactor power levels are now sensed by means of fission chambers and other ionization detectors. These detectors are usually placed outside the core of the reactor to minimize radiation and temperature damage to the detectors and connecting cables. These detectors require a relatively high polarizing voltage as well as a fissionable coating. During operation the detectors are subject to radiation even though not placed in the core and this radiation causes damage to the detector and cabling. The detector produces weak pulses which are severely degraded by the noise generated by cable breakdown. The fissionable coating material is used up and the filling gas becomes contaminated so that the detectors must be replaced and/or recalibrated. Cables are also subject to radiation damage and must often be replaced more frequently than the detectors.

In a reactor, in addition to the gamma radiation associated with the fission reaction of the reactor, a large amount of background radiation is present. The background radiation is the result of the gradual decay of products of local irradiation and is present when the reactor is inoperative. In order to provide for proper measurement of the power level from the reactor, it is necessary to distinguish between the low-energy background radiation and the high energy gamma flux from an operating reactor. While Cherenkov radiation has been detected in operating reactors, it has not been useful to measure the power level of the reactor as the Cherenkov radiation was partly the result of the background radiation in the reactor.

It is therefore an object of this invention to provide an improved power level detector for a nuclear reactor which is not damaged by radiation.

Another object of this invention is to provide a power level detector for a nuclear reactor in which cables are not required inside the reactor.

Another object of this invention is to provide a power level detector for a nuclear reactor which does contain a fissionable material.

Another object of this invention is to provide a power level detector for a reactor which can distinguish between background radiation and the gamma radiation developed by the fission reaction of the reactor.

SUMMARY OF THE INVENTION

In practicing this invention a reactor power level sensing device comprising a probe filled with a gas under pressure is positioned inside the reactor to intercept high-energy gamma radiation which is developed in the reactor. The velocity of light in the gas is a function of its density, and the pressure of the gas can be chosen so that electrons with energies above a certain threshold energy have a velocity greater than the velocity of light inside the gas filled probe. The electrons immediately slow down below the speed of light in the tube and in so doing emit light (Cherenkov effect). The light thus developed can be detected by a photomultiplier tube which can be positioned outside the reactor. The gas pressure in the tube can be adjusted to change the Cherenkov threshold to some desired level. The probe tube can be polished on the inside to provide for efficient light transmission and mirrors can be used to give a zigzag path to the light so that the reactor shielding will be intact.

BRIEF DESCRIPTION OF THE DRAWING

The invention is illustrated in the single drawing, a partial block diagram and partial cross-sectional view of the invention.

DETAILED DESCRIPTION OF THE INVENTION

Referring to the drawing, a gas filled probe 10 is inserted within a reactor 11 where it can intercept gamma rays 13 which typically have greater than 5 to 6 Mev. of energy. The gamma rays release Compton recoil electrons 14, inside probe 10, which have a velocity greater than the velocity of light in the gas enclosed in probe 10. The Compton recoil electrons 14 in slowing down, emit light until their velocity is less than the velocity of light. (Cherenkov effect.)

The Cherenkov effect has an absolute threshold and thus the power monitor of this invention can be set to discriminate against radiation below a desired energy level. The velocity of light inside probe 10 depends upon the density of the gas inside the probe and the gas density can be easily adjusted to exclude recoil electrons below a desired energy level by controlling the pressure of the gas. The gas used must be of a type which does not develop light by scintillation in order to discriminate against low-energy electrons. A nonscintillating gas is considered to be a gas which does not develop, by scintillation, an appreciable amount of light in the spectral region of the light detector filter used.

In an example of a structure useful for measuring radiation and excluding recoil electrons below about 3 Mev., the tube was filled with methane gas under 400 p.s.i.g. pressure. The probe 10 was manufactured from stainless steel.

Probe 10 is inserted through reactor enclosure wall and shield 16. A plug 17 covers the opening for probe 10. Rays 19 representing the Cherenkov radiation are reflected in a zigzag path to photomultiplier 20 by mirrors 22 and 23. Mirrors 22 and 23 are very thin to prevent gamma radiation from being reflected to the outside of the reactor. The inside surface of probe 10 can be highly polished to minimize light loss. Since the gas is relatively immune to the temperature and radiation in a reactor, the probe 10 can be placed close to the core.

The light reaches photomultiplier 20 through a window 25 which acts to seal the enclosure containing the gas. A filter 26 may be used to remove any possible scintillation light which may be developed. Photomultiplier 20 is sensitive only to the light from the Cherenkov radiation to develop electrical signals which are amplified in preamplifier 28.

A measuring circuit 29 is coupled to preamplifier 28 to measure the magnitude of the current developed by photomultiplier 20 and thus the power level of the reactor. A pump and gas supply 31 is connected to the probe to provide and maintain the gas pressure in the probe.

The embodiments of the invention in which an exclusive property or privilege is claimed are defined as follows:

1. A power level sensing device for use in a nuclear reactor, the reactor developing a low-energy background radiation and a high-energy gamma flux which is a function of the power level of the reactor, including in combination, a hollow probe positioned within the reactor to receive the high-energy gamma flux and background radiation generated therein, said probe being filled with a nonscintillating gas, said high-energy gamma flux and said background radiation interacting with said gas and said probe to develop Compton recoil electrons therein, said gas being at a pressure so that the velocity of said electrons developed by said high-energy gamma flux exceeds the velocity of light in said gas to cause generation of Cherenkov radiation, said gas further being at a pressure so that the velocity of said electrons developed by said background radiation is less than the velocity of light in said gas whereby no Cherenkov radiation is generated, and measuring means positioned outside of the reactor and shielded from said gamma flux and said background radiation, said probe further having means therein for directing said Cherenkov radiation to said measuring means for measuring the magnitude of said Cherenkov radiation therein and thereby the power level of the reactor, wherein said gas is methane under a pressure of approximately 400 p.s.i.g.

2. The reactor power level sensing device of claim 1 wherein, said gas is under a pressure so that said Cherenkov radiation results from gamma radiation having energies greater than 3 Mev.

3. The reactor power level sensing device of claim 1 wherein, said means for measuring include a photomultiplier tube positioned to intercept said Cherenkov radiation for measuring its intensity.

4. The reactor power level sensing device of claim 3 wherein, said probe is in the form of a hollow tube having an inside surface, with said inside surface being polished to reflect light.

5. The reactor power level sensing device of claim 4 wherein, said hollow tube has a zigzag path to prevent radiation from inside the reactor from reaching said photomultiplier, and a plurality of mirrors positioned with said hollow tube to deflect said Cherenkov radiation along said zigzag path to said photomultiplier.

6. The reactor power level sensing device of claim 1 wherein, the reactor has a background radiation having energies less than a particular level, said gas being under a pressure so that said Cherenkov radiation results from gamma radiation having energies greater than said particular level.